United States Patent [19]
Donot

[11] 3,791,284
[45] Feb. 12, 1974

[54] MACHINE FOR MAKING COFFEE BEVERAGE

[76] Inventor: Guy R. Donot, 11, rue Richepanse, Paris, France

[22] Filed: Jan. 26, 1972

[21] Appl. No.: 220,832

[30] Foreign Application Priority Data
Jan. 29, 1971  France .............................. 71.03068
June 14, 1971  France .............................. 71.21546
Aug. 10, 1971  France .............................. 71.29212

[52] U.S. Cl. ................................... 99/289, 99/302
[51] Int. Cl. ............................................ A47j 31/00
[58] Field of Search ..... 99/282, 283, 289, 300, 302, 99/297, 281, 287

[56] References Cited
UNITED STATES PATENTS
3,266,410  8/1966  Novi ..................................... 99/287
3,440,951  4/1969  Barrera ................................. 99/282
3,683,790  8/1972  Black .................................... 99/289

*Primary Examiner*—Robert W. Jenkins
*Attorney, Agent, or Firm*—Abraham A. Saffitz

[57] ABSTRACT

Machine for making a coffee beverage and dispensing the same into cups. The machine has a single water circuit in a part of which the water is cold and in the other part of which it is hot. The pressure-fed cold water actuates a jack, the mobile armature of which is formed by a boiler completely filled up with hot water. The water actuating the jack first shifts the boiler and then enters the boiler, causing the ejection of an equal amount of hot water. The hot water passes through ground coffee contained in a filtering chamber bounded by the boiler bottom and a duct provided in a swivelling platform.

9 Claims, 4 Drawing Figures

MACHINE FOR MAKING COFFEE BEVERAGE

The present invention relates to a machine intended to make a coffee beverage or other similar infusions, and more specifically to a machine in which the complete cycle of operations, required for the preparation of the coffee beverage, is accomplished automatically through the mere setting of a cup on the machine turntable.

Within the previous state-of-the-art, automatic machines for the preparation of coffee were known in that they included a swiveling platform with three cavities or ducts and these, during the successive stops of said swivelling platform, were assuming positions whereby appropriate devices would face these ducts and simultaneous fulfill the operation of dosing in the ground coffee into an empty duct, filter the hot water into another duct filled with ground coffee and then drain a third duct of the coffee grounds it held.

These machines incorporate various operational drawbacks, the most serious being that they include two separate water distribution networks, one for cold water in order to actuate the hydraulic control systems of the machine, and the other for hot water intended for filtration through the ground coffee. Thus, water filtering in the coffee requires a filtering chamber formed by depressing a bell by hydraulic means over the edge of a duct containing ground coffee, then to pour hot water into the bell.

Two water distribution systems increase the number of seals and therefore a proportional increase in possible leaks of liquid water and of water steam. Furthermore, the pouring of ground coffee into a duct from the aperture of a coffee-mill does not promote the availability of a mass of coffee that would be adequately packed so as to obtain a quality coffee beverage. It becomes necessary to pack the ground coffee with a tamper or to use coffee dosages wrapped in filter paper bags.

The object of said invention is a coffee machine provided with a single water circuit in which the water itself is used to make the coffee and, prior to filtration through the coffee, actuates the unit hydraulic control systems.

According to this invention, the machine includes a source of pressure cold water, a hydraulic jack which includes a chamber and controlled by this pressure water penetrating into said chamber, a hollow bell which is both the movable jack shell and the machine boiler, filled with water and containing the means for water heating, a valve to allow water flow from jack chamber into the bell when this water has reached a pre-set pressure, a valve and an outlet channel for the hot water flowing out of the boiler, a swivelling platform with ducts, and means for duct fill up with ground coffee, the ducts of said swivelling platform routed beneath boiler bottom and which can be locked tight between said bottom and a baseplate so as to form a tightproof filtering chamber with water containing a dosage of ground coffee and in which chamber emerges the boiler outlet channel, and coffee flow channel toward coffee cups. The means for duct fill up with ground coffee and coffee tamping include a vertical cylindrical spout linked to an output pipe of the coffee-mill, a wormscrew in said spout driven by a motor so as to rotate opposite to one of the locked swivelling platform duct, a free-translation coupling device between this motor and the wormscrew and means for coffee-mill motor control through wormscrew translation.

The invention shall now be described in detail and in relation to the addended drawings in which.

Figure 1:
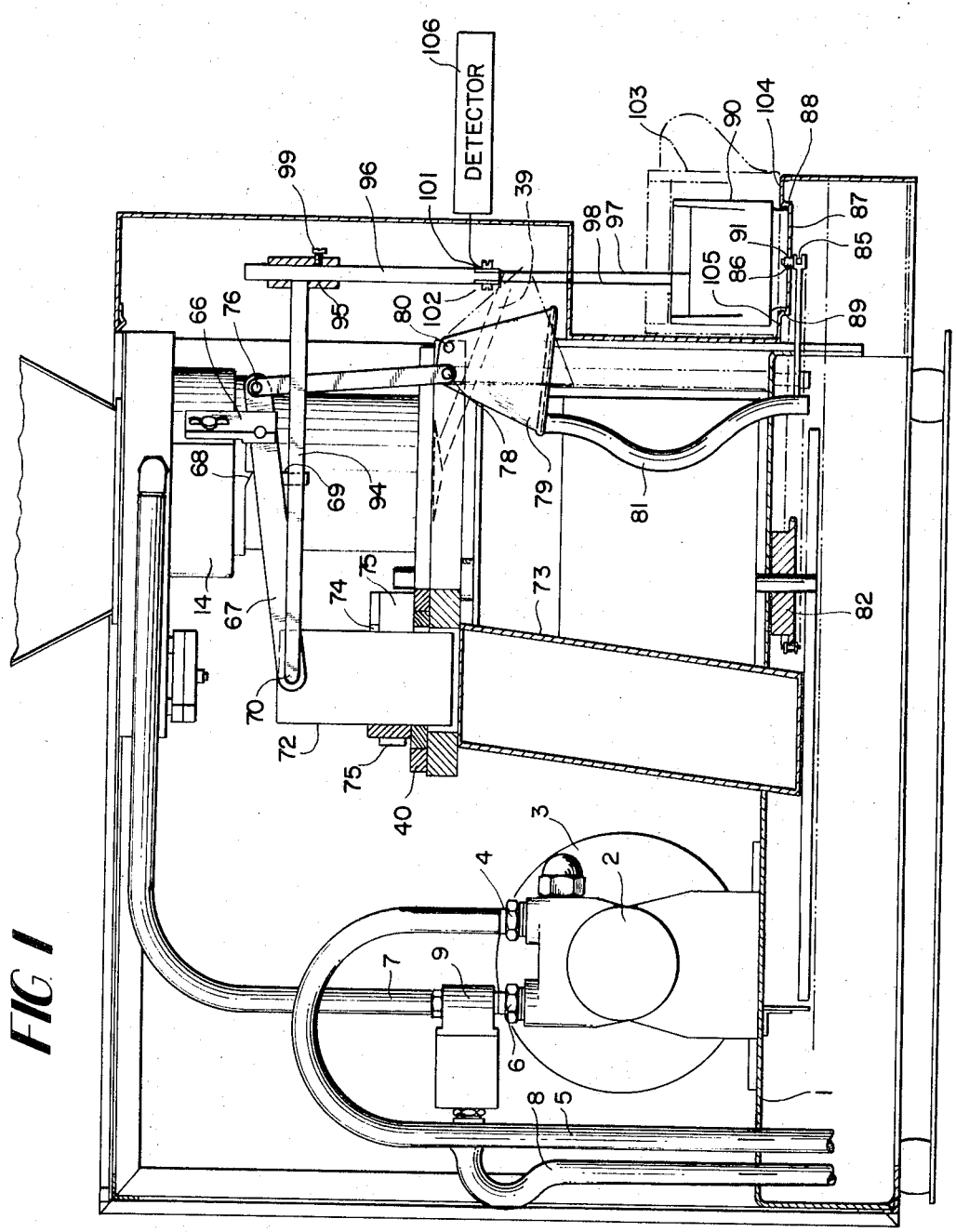
FIG. 1 is a lateral view of the machine with, in particular, the pump, the grounds discharge system, the probe system to determine the level in the cups and the retractable gutter.
Figure 2:
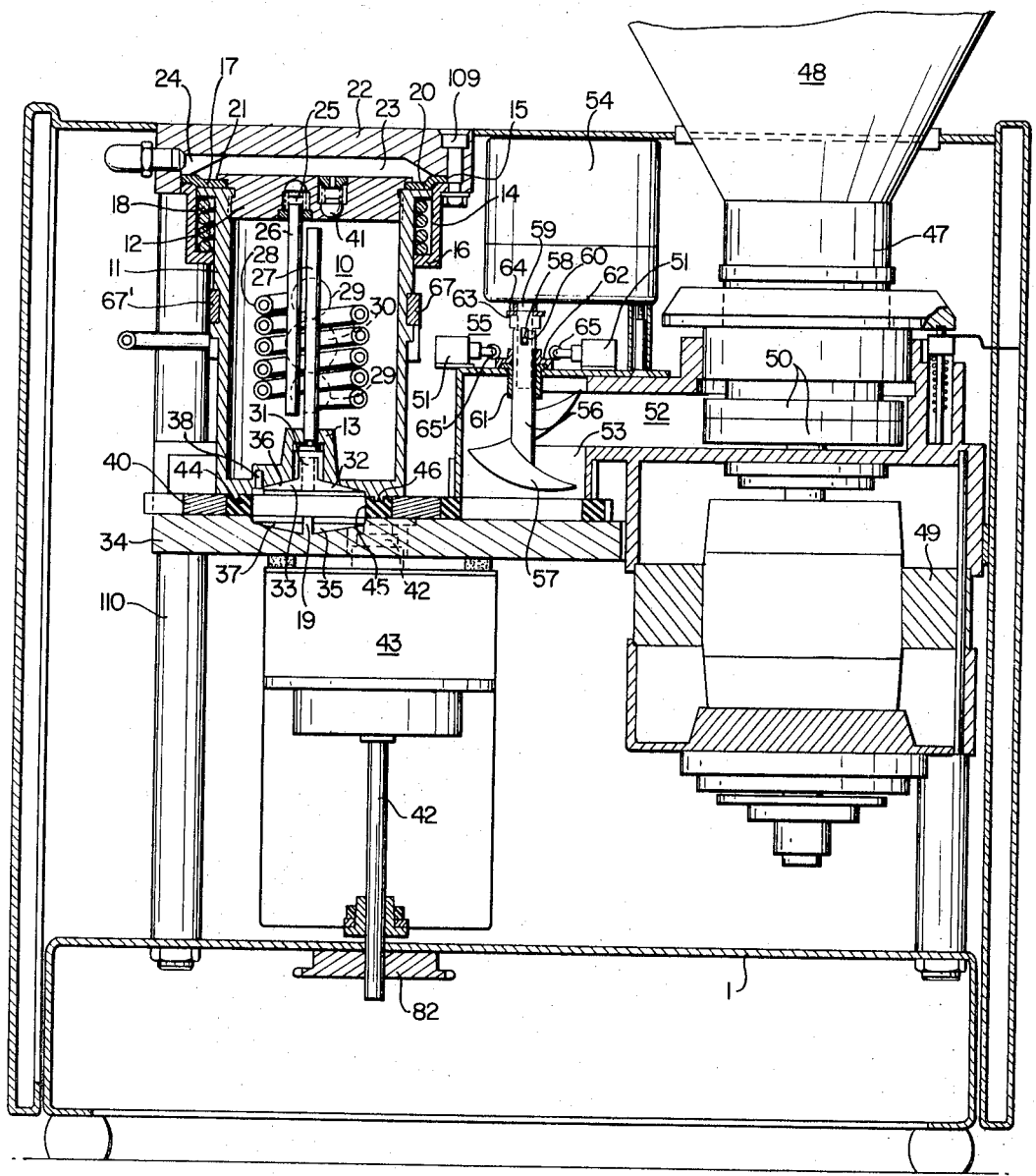
FIG. 2 is a view partially in elevation and partially in cross-section of the machine, showing in particular, the boiler, the boiler shift jack and the coffee-mill.
Figure 3:
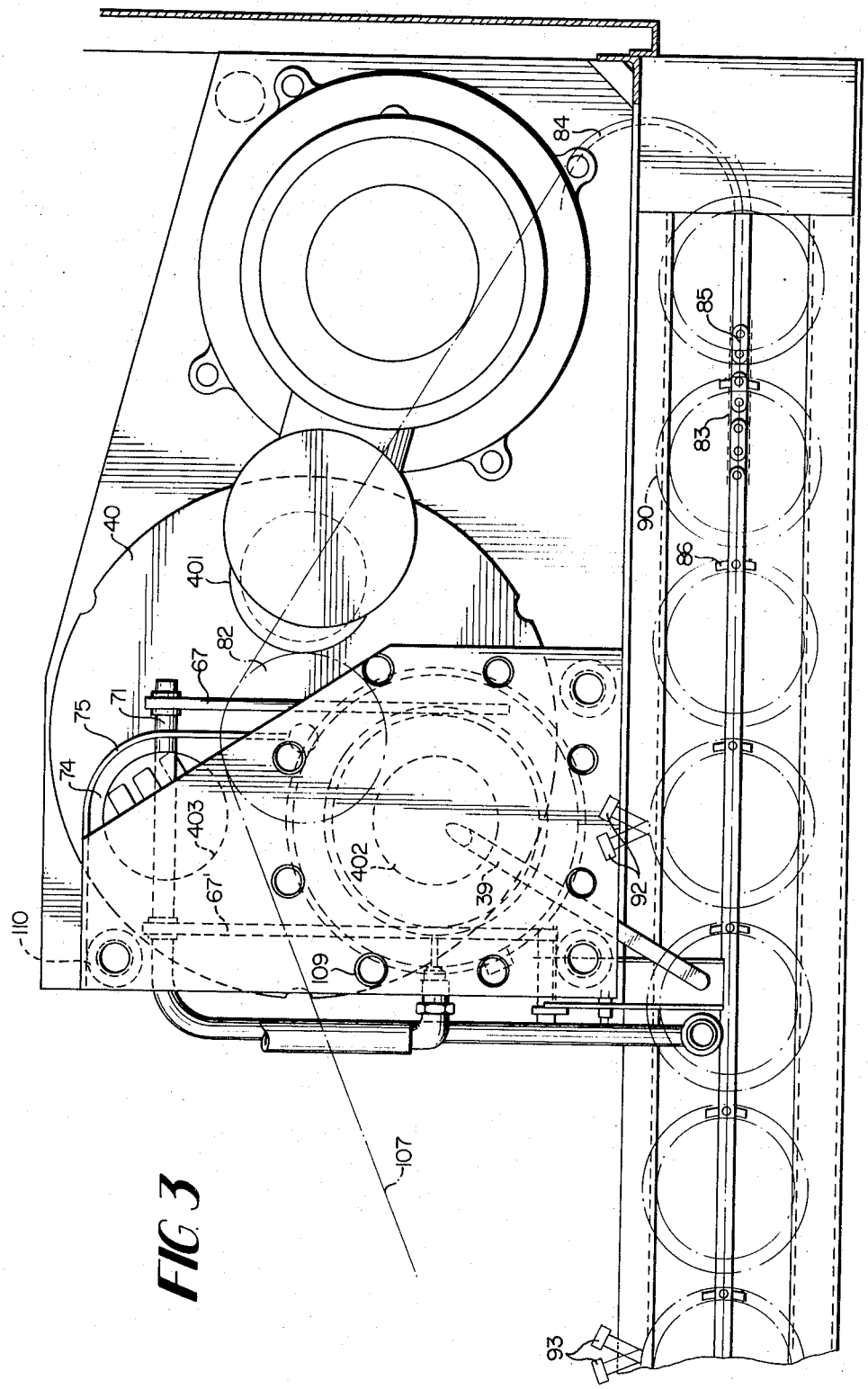
FIG. 3 is a plan view of the machine, showing in particular, the cup conveyor system.
Figure 4:
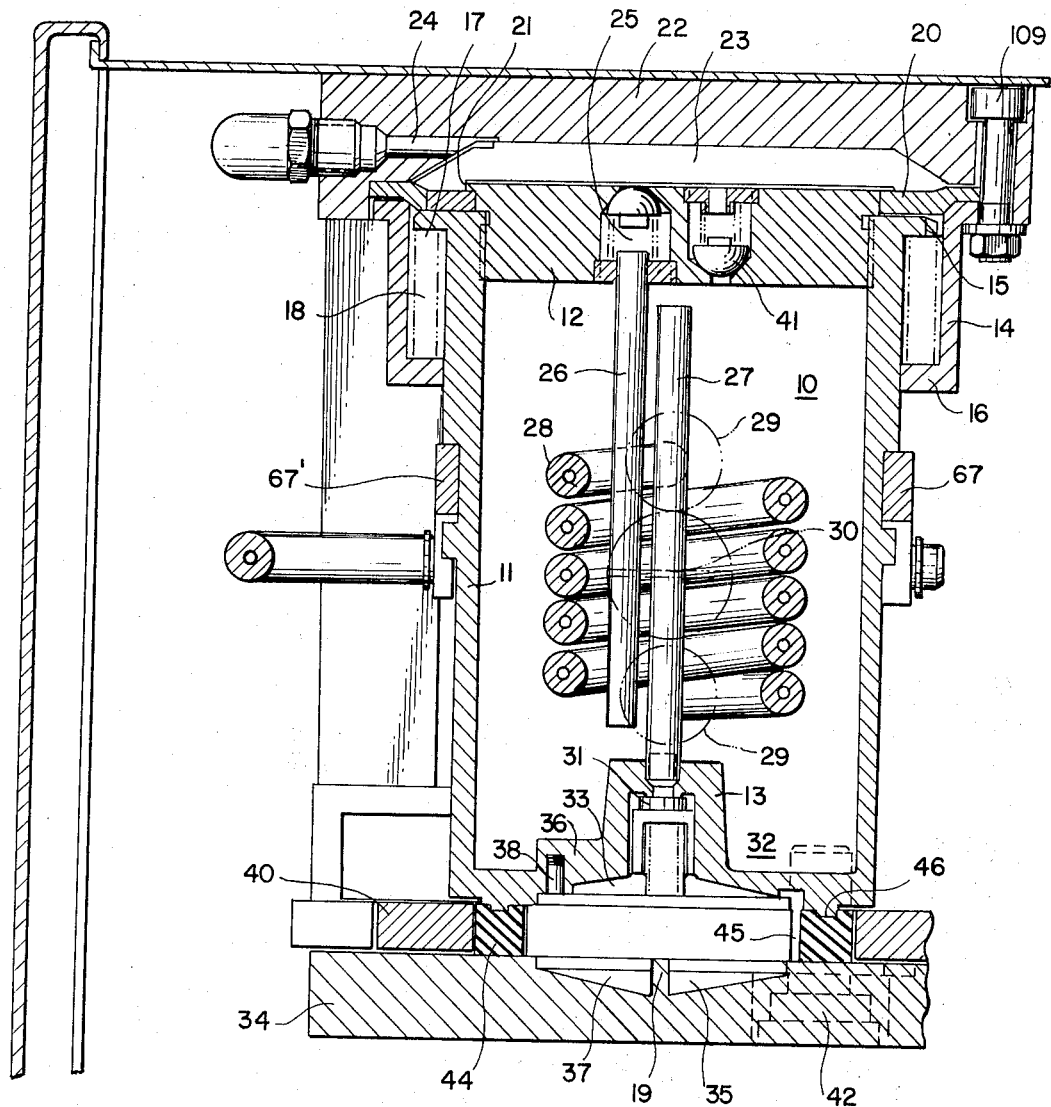
FIG. 4 is an enlargement view of the boiler.

Referring to FIGS. 1–3, 1 depicts the unit framework and 2 is the pump driven by an electric motor 3. This pump receives through piping 5 and inlet 4 water from a cold water supply source and through its outlet 6 and piping 7 thrusts cold water out under a pressure of 150 to 200 pounds per sq. inch to a movable boiler generally designated by reference numeral 10 as a whole assembly. Near the outlet 6 a discharge piping 8 is connected onto piping 7 by means of a three-way directional valve 9.

The movable boiler 10 is a cylindrical container 11 closed by a screwed-on cover 12 and its bottom includes a center portion 12 projecting toward the inside of the boiler. The boiler can accept a vertical shift of some few millimeters (3 to 6 mms), from top to bottom and bottom to top. It is guided in such shift by a cylindrical guide 14 fastened to the framework and coaxial to the boiler 10, against the inner facing on which an edge 15 of the boiler extending horizontally toward the exterior rests, while said guide is itself provided with an edge 16 extending toward the inside and resting on the external facing of wall 11 of the boiler. Within the ring flange spacing 17 located between the boiler 10 and the guide 14 is a spiral spring 18 ; under normal operation, this spring holds the boiler in its high position 10.

Boiler cover 12 is interlocked with an elastic diaphragm 20 in the shape of a flat annular flange with inner edge held between the top edge 15 of the wall 11 and the cover 12, the latter being provided for this purpose with a claw overlap 21 which notches into the thickness of the diaphragm when the cover is screwed on the boiler. The external edge of the diaphragm 20 is embedded between a plate 22 and an overlap of the guide 14. Plate 22 is secured to guide 14 by means of bolts 109 and its underside is shaped as a vat to form with diaphragm 20 and top of cover 12 a chamber 23 in which the cold water emerges under pressure as it arrives through outlet piping 7 of the pump and a hole 24 drilled laterally in plate 22.

The spring valve 25 encased in a housing of cover 12 allows passage through from chamber 23 and the inner space of boiler 10 through a vertical hose 26 fastened to the cover under the valve and emerging by means of its free end into the lower portion of the inner space.

Inside the bell 10, there is another vertical hose 27 fastened at the center of the bottom 13, the free end of which emerges into the top area of the inner space, plus an electric heating coil 28 with ends connected to two power terminals 29 which represent the tightproof crossings of the water boiler. At its mid-section, the wall 11 of the boiler has a thinned out segment 30 forming an external cavity to the boiler and in which a thermostat is arranged, which is not shown in the drawings. This thermostat triggers the heating system when water temperature in the boiler drops below a preset temperature, let us say of 90°C.

Inside the protrusion 13 at boiler bottom is fitted a spring valve plug 31 through which boiler water can travel toward a filtering chamber 32. This filtering chamber 32 is formed between boiler bottom 10 shaped as a recess space 35 toward the bottom and the top of a base-plate 34 shaped as a recess space 35 as seen toward the bottom and the walls of a duct of a swivelling platform 40. On either side of the duct in this swivelling platform, the filtering chamber is bounded by means of two screens 36 and 37; the screen 36 is fastened to the boiler bottom with screws, - one only can be seen in FIG. 2 at 38. Screen 37 is simply set into recess 35 and rests on a wedge 19 at the center of this recess. A piping 39 emerges from recess 35 bottom which is the coffee cup fill-up piping. A second spring valve 41 is housed into cover 12 and its purpose shall be described later.

Under the boiler there is a swivelling platform 40 driven by a shaft 42 of a motor 43. This swivelling platform rotates in contact with baseplate 34. It is drilled for 3 ducts 401, 402, 403, and the inner surface of each duct is lined with a flange seal 44 in rubber or other elastic material being held in place by a metallic ring 45. This metallic ring can be changed and by using different inner O-rings, it is possible to modify the capacity of these ducts.

The ducts run right above the baseplate 34 and move forward by one third of turn and they reach in succession the ground coffee supply position, filtering position and ejection of coffee grounds position. In FIG. 3, duct 401 is in the supply position, duct 402 in the filtering position and duct 403 in the grounds eject position. Boiler 10 bottom includes an area 46 shaped as a circular projection which in the lower boiler position rests on seal 44. The result is that seal 44 is pressed against the base-plate 34 and duct 402 in addition to recesses 33 and 35 form as has already been said a filtering chamber 32 made tightproof by means of seal 44.

Referring to FIG. 2, 47 depicts a coffee-mill and its hopper is 48, its motor 49 and its grinders 50. Turning the coffee-mill ON or OFF is controlled by microswitch 51. The coffee-mill delivers a ground coffee dosage through the outlet piping 52. This piping emerges into a vertical cylinder or spout 53 interlocked with the mill so as to be axially lined with one of the ducts 401, 402, 403 of the swivelling platform 40 when the latter is stopped.

Above the spout 53 is a motor 54 coupled through a transmission coupler 55 to shaft 56 of a wormscrew 57. The coupling is fitted by pin 58 secured to shaft 59 of motor 54 and by a lengthwise slot 60 in shaft 56 of wormscrew or Archimedean screw 57. The shaft 56 is guided by a cylindrical ring 61 and has a flange 62 which is used as a low rest for a spring 63 which, at its high end rests on another flange 64 borne by shaft 59 of motor 54. Turning the Archimedean screw 57 ON or OFF is controlled by microswitch 51'. The flange 62 cooperates with the switch rods 65 and 65' of the two microswitches 51 and 51'. The flange acts first of all on the switch rod of microscopic 51 which has for purpose to stop motor 49 of the coffee-mill 47, then it acts on the switch rod of microswitch 51' which has for function to stop motor 54 of the wormscrew 57.

This wormscrew has just one turn located across the opening of piping 52 and inside the spout 53. The lower edge of the screw begins to rotate in the plane of baseplate 34, then goes up as ground coffee is supplied and reaches the top level of the duct in which level it is stopped.

Referring again to FIG. 1, two brackets, diametrically opposed in relation to the boiler, one only of which 66 can be seen on the figure, are fastened to member 14 and, at their ends, they are pivoted to two levers 67 and 67'. These levers are controlled and guided each by means of two blades 68 and 69 hard fastened on boiler shell and resting on the lever edges. At their end 70, levers 67 and 67' are hinged to an axle crossing ejection piston 72. This piston can pass through the ducts of swivelling platform 40 to chase out coffee grounds. These grounds are ejected through a discharge piping 73 leading to a drain rack or directly to sewers. The ejection piston 72 is guided in its run by means of a punched plate 74 fastened to a column 110 of the framework. Over a certain angular development, this plate is reinforced to form a support for a rubber scraper 75 used to sweep excess grounds toward the discharge piping 73.

The second end 76 of each lever 67 is hinged to a connecting rod 77, itself hinged at 78 to a gutter 79 able to rotate around a kingpin 80. This gutter can occupy two positions, one in which its top portion is opposite the free opening of piping 39 and the other in which it is shifted in relation to this opening. The gutter is linked to a flexible hose 81 leading to the drain rack or to the sewers. The purpose for this gutter is to pick up, after coffee cup fill up, the drops of coffee dripping down from piping 39.

The shaft 42 of motor 43 of swivelling platform 40 is extended toward the bottom and bears a sprocket wheel 82 driving a chain conveyor. The conveyor includes a chain 83 engaged with the drive sprocket wheel 82 and two loose sprocket wheels, only one 84 being shown in FIG. 3. Some links 85 of chain 83 bear pushers 86 having a curved shape assuming that of the cups 90. The machine front panel has a horizontal slide path or track for the cups, thus track being bordered by two edges 86 and 89 acting as platforms. The track width is slightly wider than the diameter of the bottom of the coffee cups. Track 87 is provided with an axial slit 91 from which pushers 86 protrude. When the conveyor system is operative, each pusher pushes the cup which is in front of it from right to left. The step-by-step chain advance is synchronized with swivelling platform rotation.

Along track 87 two photoelectric barriers are set up 92 and 93 each including a lamp and a photocell located side by side. These photoelectric barriers operate when a cup intercepts the light beam transmitted by the lamp, the cup thus playing the role of a mirror reflecting back the ligh beam toward the cell. Hence, the presence of a cup in front of the photoelectric barrier 92 initiates the machine cycle or program. The photoelectric barrier 93 is located at the end of the slide path and it has for purpose to stop the machine cycle. In FIG. 3, the two photocell barriers are spaced three cups apart so as not to increase uselessly the drawing width, but the space between the barriers can of course be wider than shown.

A horizontal bar 94 is secured to the ejection piston 72 and this bar bears a vertical probe-holder 95 at its end.

This probe-holder handles an insulating rod 96 ended by two steel wires of the piano string type 97 and 98. The height of rod 96 in the probe-holder 95 can be adjusted by means of lock screw 99. Each of the probes 97 and 98 can be connected to a current source by means of strands 101 and 102, respectively, connected to them, but for a given use, just one of the two probes is actually connected. The purpose of these probes is to ascertain that the level of coffee in the cups remains regularly constant.

Probe 97 is a relatively lengthy probe provided for the determination of steady coffee level in tasting cups 90. Probe 98 is a relatively short probe which is intended for the same purpose but for breakfast cups 103. These breakfast cups have a diameter larger than that of the tasting cups and, instrad of lying on the slide track bottom 87, they rest on the platforms 104 and 105 of the slide track and are therefore out of engagement with the pushers.

The coffee-making machine operates as follows:

The cycle is initiated by the photoelectric barrier 92. It is stopped by probe 97 or by the photoelectric barrier 93. The signal picked up by the photocell of the photoelectric barrier 92 is applied to motor 3 of the pump 2, to motor 43 of the swivel-ling platform and of the conveyor, to motor 49 of the coffee-mill 47 and to motor 54 of coffee supply wormscrew.

The pump 2 is driven by motor 3 dispatches cold water under pressure into chamber 23 of the jack through piping 7. The jack chamber expands and boiler 10 is forced downward. When the boiler hits and rests on the swivelling platform, spring valve 25 opens and cold water flows into the boiler. At the same time, hot water outlets through spring valve 31, crosses filtration chamber 32 which includes duct 402 and flows out through piping 39 into cup 90.

In its downward motion, boiler 10 pulls along ejection piston 72 in order to chase coffee grounds from duct 403 and brings probe 97 into its operating position in the still empty cup.

Cofee-mill 47 grinds away to provide ground coffee at its outlet 52.

The wormscrew 57 is pushed downward inside duct 401 by its spring 63 and starts filling the duct with ground coffee. During this fill up sequence, flange 64 moves upward and actuates in succession the microswitch 51 to stop motor 47 of the coffee-mill and microswitch 51' to stop motor 54 of the wormscrew.

When the coffee level has reached the extremity of probe 97, keeping in mind that the coffee is at the machine ground potential and the probe at a non-zero potential, a current is allowed to flow through wire 101 which is detected by detector 106. The signal thus generated stops motor 3 of the pump 2 and sets the three-way directional valve into the position coupling pipings 7 and 8. The cold water entered into the boiler has heated up during the cycle and its volume has increased. A slight amount of surplus water is dispatched back from boiler 10 to chamber 23 through valve 41.

What I claim is:

1. A machine for making a coffee beverage comprising a pressure-fed cold water source, a hydraulic jack having a variable volume chamber bounded by a mobile armature, said mobile armature being formed by the cover of a boiler, a swivelling platform having three ducts and rotatable by third of turn steps, means for entering said pressure-fed cold water into said jack chamber, shifting said boiler and applying said boiler bottom against said duct periphery, whereby a tight-proof filtering chamber is formed, means for injecting said pressure-fed cold water from said jack chamber into said boiler, means located in said boiler for conver-ting said cold water to hot water, means for ejecting said hot water from said boiler into said filtering chamber, a dispensing piping originating in said filtering chamber, means for filling up said ducts with ground coffee and means for chasing out the coffee grounds.

2. A machine for making a coffee beverage according to claim 1 in which the swivelling platform turns in contact with a stationary base-plate having an upward directed vat-shaped recess and the bottom of the boiler has a downward directed vat-shaped recess, whereby the filtering chamber is formed by a duct of the swivelling platform together with said upward or downward directed vat-shaped recesses.

3. A machine for making a coffee beverage according to claim 1 in which the means for injecting the pressure-fed cold water from the jack chamber into the boiler comprises a spring biased first valve in the boiler cover and a piping originating from said first valve, and freely terminating inside the boiler at the higher part thereof and the means for ejecting the hot water from the boiler into the filtering chamber comprises a spring biased second valve in the boiler bottom and a piping originating from said second val-ve and freely terminating inside the boiler at the higher part there-of.

4. A machine for making a coffee beverage comprising a pressure-fed cold water source, a hydraulic jack having a variable volume chamber bounded by a mobile armature and a stationary armature, said mobile armature being formed by the cover of a boiler, a swivelling platform having three ducts and rotatable by third of turn steps, means for entering said pressure-fed cold water into said jack chamber, shifting said boiler and applying said boiler bottom against said duct periphery, whereby a tight-proof filtering chamber is formed, means for injecting said pressure-fed cold water from said jack chamber into said boiler, means located in said boiler for converting said cold water to hot water, means for ejecting said hot water from said boiler into said filtering chamber, a dispensing piping originating in said filtering chamber, a coffee-mill supplying the ducts of the swivelling platform with ground coffee, an Archimedean screw for spreading and packing the ground coffee, said screw having an axis perpendicular to said swivelling platform, and coaxial with a duct when said platform is stopped and being translatable along said axis and means for chasing out the coffee grounds.

5. A machine for making a coffee beverage according to claim 4 in which the mobile armature of the hydraulic jack is connected to the stationary armature by an annular member formed of resilient material and having an inner edge, secured to said boiler cover and an outer edge connected to said stationary armature.

6. A machine for making a coffee beverage comprising a pressure-fed cold water source, a hydraulic jack having a variable volume chamber bounded by a mobile armature and a stationary armature, said mobile armature being formed by the cover of a boiler, an externalled projecting annular ring on said boiler bottom, a swivelling platform rotatable by third of turn steps, three ducts in said platform, resilient material rings lining said ducts, metal rings adjacent to said resilient rings, means for entering said pressure-fed cold water into said jack chamber, shifting said boiler and applying said boiler bottom annular ring against said duct resilient material ring, whereby a tight-proof filtering chamber is formed, means for injecting said pressure-fed cold water from said jack chamber into said boiler, means located in said boiler for converting said cold water to hot water, means for ejecting said hot water from said boiler into said filtering chamber, a dispensing piping originating in said filtering chamber, a coffee-mill supplying the ducts of the swivelling platform with ground coffee, an Archimedean screw for spreading and packing the ground coffee, said screw having an axis perpendicular to said swivelling platform, and coaxial with a duct when said platform is stopped and being translatable along said axis and means for chasing out the coffee grounds.

7. A machine for making a coffee beverage comprising a pressure-fed cold water source, a hydraulic jack having a variable volume chamber bounded by a mobile armature, said mobile armature being formed by the cover of a boiler, a swivelling platform having three ducts and rotatable by third of turn steps, means for entering said pressure-fed cold water into said jack chamber, shifting said boiler and applying said boiler bottom against said duct periphery, whereby a tight-proof filtering chamber is formed, means for in-jecting said pressure-fed cold water from said jack chamber into said boiler, means located in said boiler for converting said cold water to hot water, means for ejecting said hot water from said boiler into said filtering chamber, a dispensing piping originating in said filtering chamber, means for filling up said ducts with ground coffee, a shiftable ejection piston for chasing out of the coffee grounds and lever means controlled by said boiler shifting means for controlling the shift of the ejection piston.

8. A machine for making a coffee beverage and dispensing the same into cups comprising a pressure-fed cold water source, a hydraulic jack having a variable volume chamber bounded by a mobile armature, said mobile armature being formed by the cover of a boiler, a swivelling platform having three ducts and rotatable by third of turn steps, means for entering said pressure-fed cold water into said jack chamber, shifting said boiler and applying said boiler bottom against said duct periphery, whereby a tight-proof filtering chamber is formed, means for injecting said pressure-fed cold water from said jack chamber into said boiler, means located in said boiler for converting said cold water to hot water, means for ejecting said hot water from said boiler into said filtering chamber, a dispensing piping originating in said filtering chamber, means for filling up said ducts with ground coffee, means for chasing out the coffee grounds, a shiftable conductive feeler brought to a non-zero electic potential for defining the coffee level in the cups, lever means controlled by said boiler shifting means for controlling the feeler shift, and means for detecting a current flow in said feeler.

9. A machine for making a coffee beverage and dispensing the same into cups conprising a pressure-fed cold water source, a hydraulic jack having a variable volume chamber bounded by a mobile armature, said mobile armature being formed by the cover of a boiler, a swivelling platform having three ducts, a motor for driving said platform by third of turn steps, means for entering said pressure-fed cold water into said jack chamber, shifting said boiler and applying said boiler bottom against said duct periphery, whereby a tight-proof filtering chamber is formed, means for injecting said pressure-fed cold water from said jack chamber into said boiler, means located in said boiler for converting said cold water to hot water, means for ejecting said water from said boiler into said filtering chamber, a dispensing piping originating in said filtering chamber, means for chasing out the coffee grounds, a glide track for the cups having a lengthwise slit, and a chain conveyor driven by said motor and bearing pushers protruding through said slit for pushing the cups along said track.

* * * * *